Sept. 8, 1925.
G. E. R. ROTHENBUCHER
1,552,760
ENGINE VALVE
Filed Jan. 2, 1924
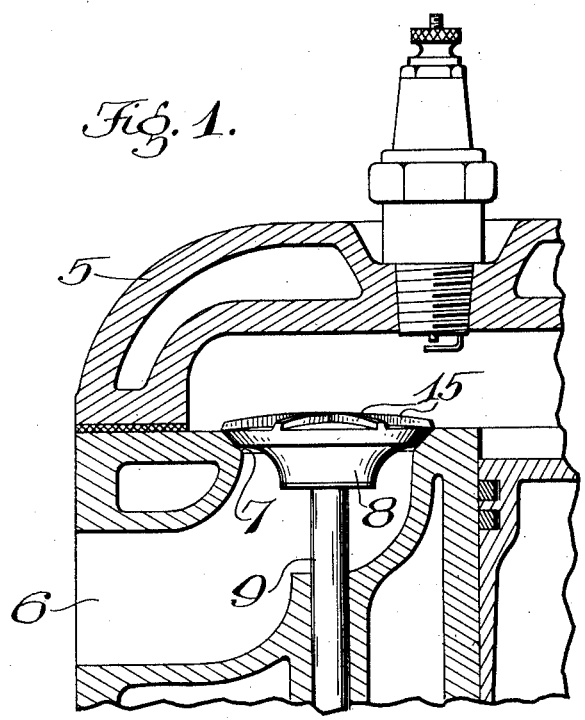
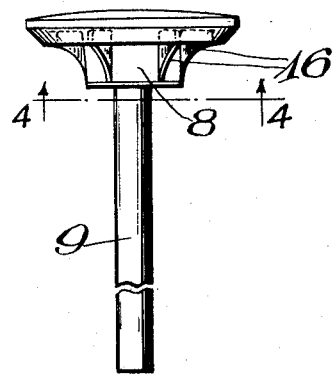
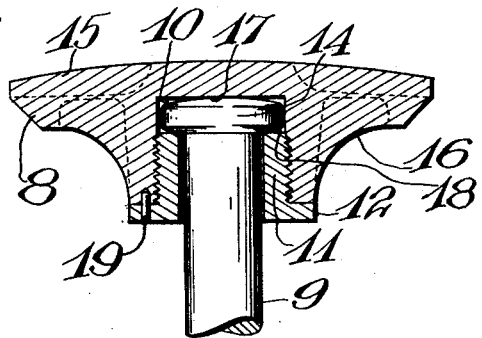
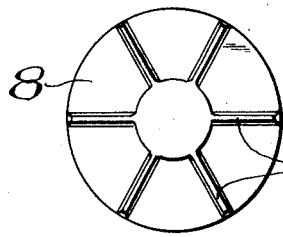
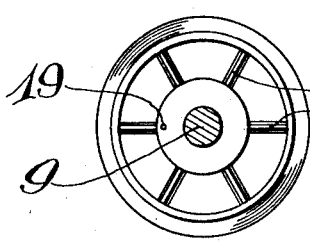
Geo. E. R. Rothenbucher
INVENTOR.
BY *Milo B. Stevens*
ATTORNEYS.

Patented Sept. 8, 1925.

1,552,760

UNITED STATES PATENT OFFICE.

GEORGE E. R. ROTHENBUCHER, OF CHICAGO, ILLINOIS.

ENGINE VALVE.

Application filed January 2, 1924. Serial No. 684,015.

*To all whom it may concern:*

Be it known that I, GEORGE E. R. ROTHENBUCHER, a citizen of the United States, residing at Chicago, in the county of Cook and State of Illinois, have invented new and useful Improvements in Engine Valves, of which the following is a specification.

This invention relates to valves for internal-combustion engines, and more particularly to valves of the poppet type. As is well known, such valves require frequent grinding to obtain a proper seating, and the invention therefore has for its object to provide a valve which is practically self-grinding, it being so constructed that it is given a slight rotary movement as it rises off its seat, this action being produced by the impact of the gases or other fluides against certain deflecting wings and the like, as will be described in detail hereinafter.

The present embodiment of my invention is an improvement over a structure on which I have filed application for patent on August 11, 1922, by Serial No. 581,171. The improvement brings about the object contemplated in the said application with the use of fewer parts; also, the scope of the improvement is wider since it makes use of the outgoing gases for the benefit of the exhaust valve, as well as of the incoming gases for the benefit of the inlet valve.

With the above considerations in view, attention is directed to the accompanying drawing forming a part of this specification, in which Figure 1 is a fragmental section of an engine cylinder, showing the improved valve, designed for the exhaust gases, in place;

Fig. 2 is an elevation of the valve, modified for the inlet gases;

Fig. 3 is a plan view of the valve shown in Fig. 1;

Fig. 4 is a section of the valve shown in Fig. 2, on the line 4—4; and

Fig. 5 is an enlarged vertical section of the head portion of the valve in an incomplete stage of construction.

Referring specifically to the drawing, 5 denotes a fragment of the cylinder block of an internal combustion engine, and at 6 is shown one of the ports thereof. This port is surrounded by a seat 7 for the valve which controls the admission of the fuel charges, or the exhaust of the spent gases, according to whether it is an inlet or an exhaust valve. The valve is of the poppet type, and it consists of a head 8 and a stem 9.

The valve head 8 is rotatably mounted on the stem 9 so that it is free to turn. This condition is attained by boring the head 8 from the bottom with a tapped recess 10, which is adapted to receive an externally threaded bushing 11 made with a flanged base, as shown at 12. Before inserting the bushing, however, the valve stem 9 is introduced. Said stem is made with a circular head 14 at its upper end, said head being of a diameter to smoothly enter the valve-head recess 10 when inserted therein. The bushing 11 is then slid on the stem and screwed into the recess until only a very slight amount of play exists between the stem-head 14 and the inner end of the recess 10. The valve head 8 is thus secured to the stem 9 but can rotate freely thereon.

To secure the automatic periodical rotation of the valves and accomplish the self-grinding thereof, as first mentioned, the head of the exhaust valve is formed with a radial series of ribs 15 on the upper side, as shown in Figure 3; and the inlet valve head is similarly ribbed underneath at 16, as shown in Figure 4. Thus, the exhaust gases, striking the head of the exhaust valve on the upper side will act upon the ribs 15 to move or rotate the head to some extent, proportionate with the velocity with which the gases are expelled from the engine cylinder; and so with the inlet valve as affected by the incoming charge. The impulse-imparting action of the gases on the respective valve heads is more evident from the fact that the gases must of necessity take a lateral course into, or out of, the cylinder through the valve openings, so that the impact of such gases with the ribbed surfaces of the heads, coupled with the freely-rotatable condition thereof on the stems while the valves are lifted from the seats, will induce the desired periodical motion of the heads automatically as the engine runs.

The stem head 14 is made with a slightly convex top surface, as shown at 17, and a sloping bottom edge as per 18, to permit the valve head to dip to a slight extent free of the stem, and thus facilitate the self-seating of the head should some irregularity develop in the axial position of the valve stem. A slight amount of play is allowed between the latter and the bushing wall to lend freedom to the above action.

From the above description, it will be apparent that my improved valve structure makes for greater efficiency in the operation of the valves, less frequent grinding, and simplicity of construction.

The sectional showing of the valve head in Figure 5 represents the stock from which either the exhaust valve or the inlet valve may be formed, the dotted lines representing the depth of the ribs 15 or 16, respectively.

In order that the bushing 11 may not loosen from vibration, it is secured to the valve head in adjusted position by drilling a small hole through the flange 12 into the head, and driving a pin 19 thereinto.

I claim:

A valve for use on internal combustion engines comprising a stem having an integral disk-shaped enlargement at one end, a head having a socket receiving said enlargement, a bushing securing said enlargement in the socket and loosely receiving said stem, the surface of said enlargement being convex and the inner wall of the socket being flat and engaged by the convex surface of said enlargement, and a plurality of radially disposed fluid contact and reinforcing wings formed integral with said head.

In testimony whereof I affix my signature.

GEORGE E. R. ROTHENBUCHER.